United States Patent
Zhivko et al.

(10) Patent No.: US 10,436,585 B2
(45) Date of Patent: Oct. 8, 2019

(54) METHOD FOR COMPENSATING FOR VENTURI EFFECTS ON PRESSURE SENSORS IN MOVING WATER

(71) Applicant: YSI, INC., Yellow Springs, OH (US)

(72) Inventors: Grozev Zhivko, San Diego, CA (US);
Martin Milanov, San Diego, CA (US);
Fan Xue, San Diego, CA (US); Daniel Wagenaar, San Diego, CA (US)

(73) Assignee: YSI, Inc., Yellow Springs, OH (US)

( * ) Notice: Subject to any disclaimer, the term of this patent is extended or adjusted under 35 U.S.C. 154(b) by 107 days.

(21) Appl. No.: 15/833,070

(22) Filed: Dec. 6, 2017

(65) Prior Publication Data

US 2018/0195861 A1   Jul. 12, 2018

Related U.S. Application Data

(60) Provisional application No. 62/430,477, filed on Dec. 6, 2016.

(51) Int. Cl.
*G01C 13/00* (2006.01)
*G01F 1/66* (2006.01)
*G01F 23/00* (2006.01)

(52) U.S. Cl.
CPC ............ *G01C 13/008* (2013.01); *G01F 1/663* (2013.01); *G01F 23/0061* (2013.01)

(58) Field of Classification Search
CPC .... G01C 13/008; G01F 1/663; G01F 23/0061
See application file for complete search history.

(56) References Cited

U.S. PATENT DOCUMENTS

| | | | |
|---|---|---|---|
| 4,448,081 A | 5/1984 | Kolitsch et al. |
| 4,941,361 A | 7/1990 | Lew |
| 5,550,789 A | 8/1996 | Silverstien |
| 5,691,914 A | 11/1997 | Randolph |

(Continued)

FOREIGN PATENT DOCUMENTS

WO    2009037434 A1    3/2009

OTHER PUBLICATIONS

Chanson, H. et al, "Acoustic Doppler velocimetry (ADV) in small estuary, Field experience and signal post-processing," Flow Measurement and Instrumentation, Oct. 2008,19(5), pp. 307-313. http://espace.library.uq.edu.au/view/UQ:152793/UQ_AV_152793.pdf.

(Continued)

*Primary Examiner* — Jamel E Williams
(74) *Attorney, Agent, or Firm* — Ware, Fressola, Maguire & Barber LLP

(57) ABSTRACT

Apparatus for taking a water depth measurement using a probe, featuring a signal processor configured to receive signaling containing information about a water depth measurement determined from a pressure sensed by a pressure sensor contained in a probe immersed in flowing water, and also containing information about a velocity-dependent offset that is determined and depends on the velocity of the flowing water; and determining corresponding signaling containing information about a corrected water depth measurement of the flowing water by correcting the water depth measurement by the velocity-dependent offset in order to compensate for Venturi effects on the pressure sensor in the moving water.

5 Claims, 3 Drawing Sheets

(56) References Cited

U.S. PATENT DOCUMENTS

| | | | |
|---|---|---|---|
| 5,777,892 | A | 7/1998 | Nabity et al. |
| 5,791,187 | A | 8/1998 | Chang |
| 5,811,688 | A | 9/1998 | Marsh et al. |
| 6,208,940 | B1 | 3/2001 | Kram et al. |
| 6,208,943 | B1 * | 3/2001 | Randolph ............... G01F 1/002 137/386 |
| 6,453,256 | B1 | 9/2002 | Gordon et al. |
| 6,575,043 | B1 | 6/2003 | Huang et al. |
| 6,658,945 | B1 | 12/2003 | Kleven |
| 6,820,008 | B1 | 11/2004 | van Smirren et al. |
| 6,972,715 | B2 * | 12/2005 | Hollis ..................... B63C 11/26 342/357.57 |
| 7,963,172 | B2 | 6/2011 | Liu et al. |
| 8,056,409 | B2 | 11/2011 | Steven |
| 8,125,849 | B2 | 2/2012 | Cabrera et al. |
| 8,215,183 | B2 | 7/2012 | Petroff |
| 8,494,788 | B2 | 7/2013 | Atkinson et al. |
| 8,654,607 | B2 | 2/2014 | Strong |
| 9,541,432 | B2 * | 1/2017 | Kertesz ............... H01M 2/1022 |
| 9,945,705 | B2 * | 4/2018 | Kertesz ............... H01M 2/1022 |
| 2004/0156681 | A1 | 8/2004 | Aughton et al. |
| 2005/0270902 | A1 | 12/2005 | Tonnessen |
| 2007/0256506 | A1 | 11/2007 | Sette |
| 2011/0138929 | A1 | 6/2011 | Young |
| 2011/0214500 | A1 * | 9/2011 | Cabrera ................. G01C 13/00 73/170.29 |
| 2012/0055263 | A1 | 3/2012 | Konzelmann |
| 2012/0174666 | A1 | 7/2012 | Gast |
| 2016/0161319 | A1 | 6/2016 | Yu et al. |

OTHER PUBLICATIONS

"Vector: 3D Acoustic Velocimeter," Nortek brochure, nortek-as.com, printed Jan. 2017. https://web.archive.org/web/20151011145806/http://www.nortek-as.com/lib/brochures/vector-brochure.

"10-MHz Adv®," SonTek, sontek.com, Apr. 6, 2014. https://web.archive.org/web/20140406210349/http://www.sontek.com/productsdetail.php?10-MHz-ADV-2.

"FlowTracker® Handheld Adv® Technical Manual Firmware," Version 3.7, Software Version 2.30, featuring SmartQC™, Sontek/YSI, 2009, pp. 1-115. https://www.uvm.edu/bwrl/lab_docs/manuals/Flow_Tracker_Manual.pdf.

"FlowTracker® Handheld ADV," SonTek YSI Incorporated, printed Nov. 2017, pp. 1-2.

"Riversurveyor® S5 and M9, A New Perspective to the Notion of Measuring Open Channel Hydraulics," SonTek.com, printed Oct. 2017, pp. 1-4. https://www.sontek.com/riversurveyor-s5-m9.

"SonTek®-SL Series, Inspired by the Need for a Simple Way to Measure Water Velocity and Level in Open Channels," SonTek.com, printed Oct. 2017, pp. 1-4. https://www.sontek.com/sontek-sl-series.

"SonTek-IQ Series, Ideal for Monitoring Flows in Canals, Culverts, Pipes, and Natural Streams," Sontek.com, printed Oct. 2017, pp. 1-7. https://www.sontek.com/sontek-iq-series.

"FlowTracker2® Handheld-ADV®, Wading Discharge Measurement Instrument," Sontek.com, printed Oct. 2017, pp. 1-4. https://www.sontek.com/flowtracker2.

"Hydrosurveyors™, Exclusive 5-Beam Depth Sounding Device," Sontek.com, printed Oct. 2017, pp. 1-4. https://www.sontek.com/hydrosurveyor.

"EXO™3," YSI.com, printed Oct. 2017, pp. 1-5. https://www.ysi.com/exo3.

* cited by examiner

Apparatus 10, e.g., including a probe for measuring the depth of water, e.g., in a river or stream, by compensating for Venturi effects on a pressure sensor in moving water Pressure sensor P Signal processor 10a configured at least to:

receive signaling containing information about a water depth measurement determined from a pressure sensed by a pressure sensor contained in a probe immersed in flowing water, and also containing information about a velocity-dependent offset that is determined and depends on the velocity of the flowing water;

determining corresponding signaling containing information about a corrected water depth measurement of the flowing water by correcting the water depth measurement by the velocity-dependent offset in order to compensate for Venturi effects on the pressure sensor in the moving water; and/or provide the corresponding signaling containing information about the corrected water depth measurement of the flowing water.

Other signal processor circuits, circuitry, or components 10b that do not form part of the underlying invention, e.g., including input/output modules/modems, one or more memory modules (e.g., RAM, ROM, etc.), data, address and control busing architecture, etc.

Water velocity determination module 20

Figure 1

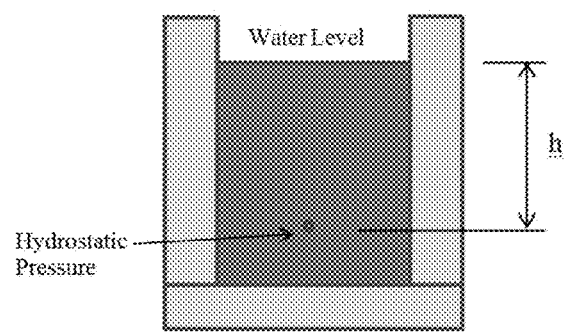
Figure 2: Hydrostatic Pressure (Prior Art)
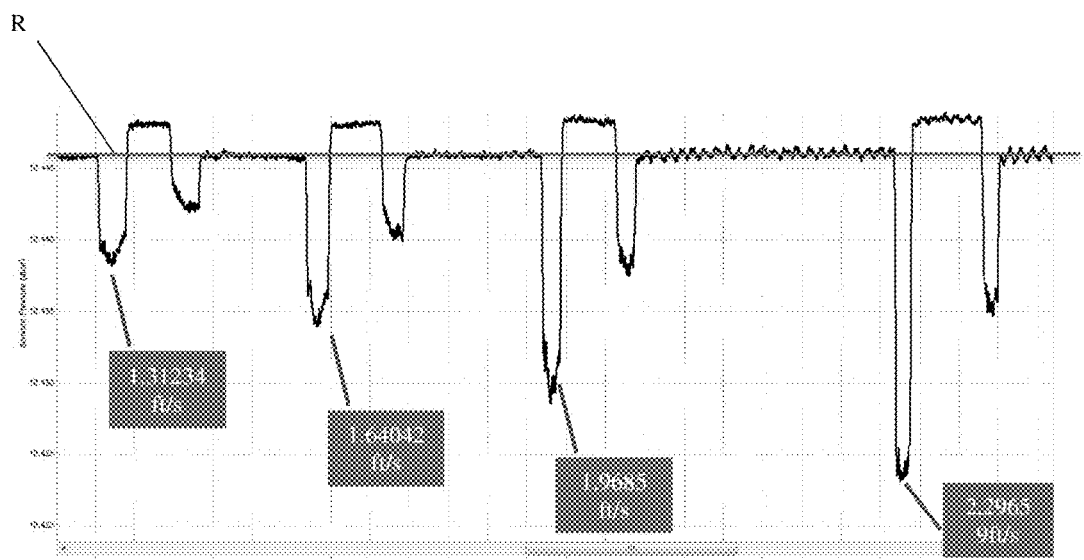
Figure 3: The effects of Water Velocity on Pressure Measurements

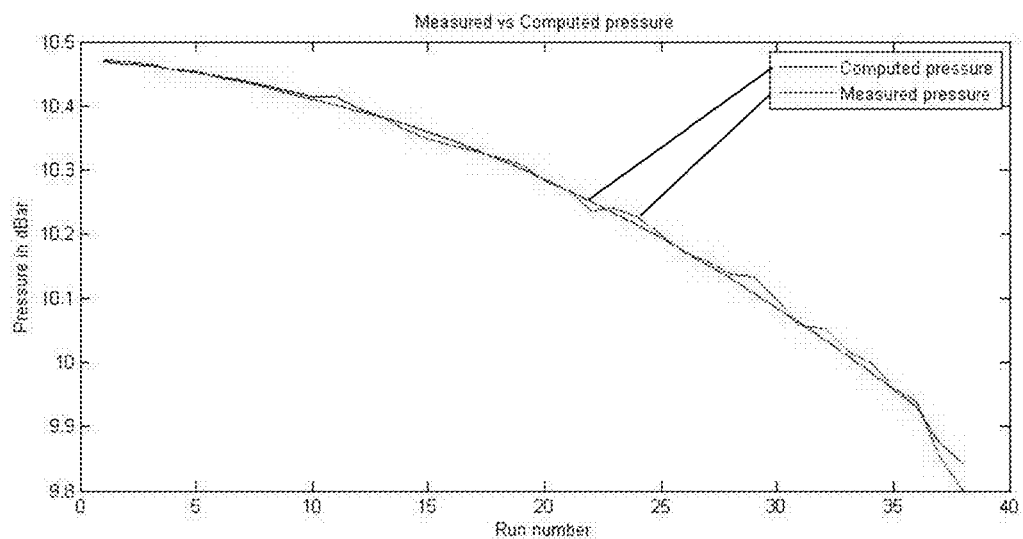
Figure 4: Measured vs Computed pressure.
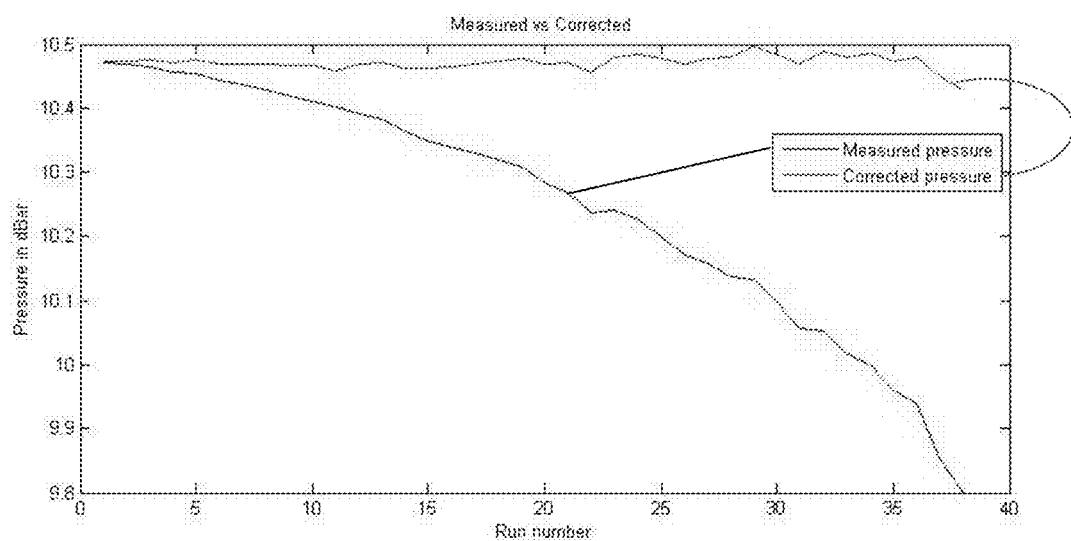
Figure 5: Measured vs Corrected pressure.

METHOD FOR COMPENSATING FOR VENTURI EFFECTS ON PRESSURE SENSORS IN MOVING WATER

CROSS-REFERENCE TO RELATED APPLICATIONS

This application claims benefit to provisional patent application Ser. No. 62/430,477, filed 6 Dec. 2016, which is incorporated by reference in its entirety.

BACKGROUND OF THE INVENTION

1. Field of Invention

This invention relates to a technique for measuring the depth of water, e.g., in a river or stream; and more particularly, to a technique for measuring the depth of water using a pressure sensor.

2. Description of Related Art

Water pressure measurements performed with a pressure sensor in flowing water are affected by water velocity and this needs to be corrected to determine the correct water depth. Known techniques for measuring the depth of water, e.g., in a river or stream using a pressure sensor do not make a correction for the water velocity. In view of this, there is a need in the art for better way for measuring the depth of water, e.g., in a river or stream, especially using a pressure sensor.

SUMMARY OF THE INVENTION

In summary, the correction of water pressure measurements performed by an instrument equipped with an acoustic Doppler velocity meter and pressure sensor is directly related to the water velocity. There are two parameters, dynamic pressure and drag coefficient that need to be determined to properly correct the measured pressure by the instrument.

The present invention builds on technology previously developed by the assignee of the instant patent application, e.g., which is sold as a product in the marketplace known as the FlowTracker® Handheld ADV®. By way of example, the reader is referred to the FlowTracker® Technical Manual (March 2009), which is known in the art and sets forth technical details for firmware version 3.7 and software version 2.30, which is incorporated by reference in its entirety. The present invention builds upon this technology, e.g., by introducing and incorporating new technology for taking a water depth measurement by compensating for Venturi effects on pressure sensors in moving water, e.g., consistent with that disclosed herein. The present invention is implemented using this new technology in a product being sold by the assignee of the present invention, e.g., known as the FlowTracker2™.

Specific Embodiments

According to some embodiments, the present invention may include, or take the form of, apparatus for taking a water depth measurement using a probe, featuring a signal processor configured to receive signaling containing information about a water depth measurement determined from a pressure sensed by a pressure sensor contained in a probe immersed in flowing water, and also containing information about a velocity-dependent offset that is determined and depends on the velocity of the flowing water; and determine corresponding signaling containing information about a corrected water depth measurement of the flowing water by correcting the water depth measurement by the velocity-dependent offset in order to compensate for Venturi effects on the pressure sensor in the moving water.

The present invention may include one or more of the following features:

The signal processor may be configured to determine the velocity-dependent offset by compensating a dynamic pressure component based upon a pressure correction coefficient to account for the Bernoulli Effect of the water depth measurement, e.g., where the dynamic pressure component may be defined by the relationship:

$$pv^2/2,$$

where p represents the fluid density and v represents the fluid speed of the moving water.

The apparatus may include, or take the form of, the probe having the pressure sensor contained therein.

The pressure sensor may include a non-vented pressure sensor.

According to some embodiments, the apparatus may include, or take the form of, an acoustic Doppler velocimeter (ADV) with a built-in probe or pressure sensor for sensing pressure for taking the water depth measurement, e.g., which may take the form of the assignee's FlowTracker2, e.g., consistent with that set forth herein.

The Method

According to some embodiments, the present invention may include a method for taking a water depth measurement using a probe, featuring:

receiving, with a signal processor, signaling containing information about a water depth measurement determined from a pressure sensed by a pressure sensor contained in a probe immersed in flowing water, and also containing information about a velocity-dependent offset that is determined and depends on the velocity of the flowing water; and determining, with the signal processor, corresponding signaling containing information about a corrected water depth measurement of the flowing water by correcting the water depth measurement by the velocity-dependent offset in order to compensate for Venturi effects on the pressure sensor in the moving water.

Computer-Readable Storage Medium

According to some embodiments of the present invention, the present invention may also take the form of a computer-readable storage medium having computer-executable components for performing the steps of the aforementioned method. The computer-readable storage medium may also include one or more of the features set forth above.

BRIEF DESCRIPTION OF THE DRAWING

The drawing, which are not necessarily drawn to scale, includes FIGS. 1-5, as follows:

FIG. 1 is a block diagram of apparatus having a signal processor configured to implement the signal processing, according to some embodiments of the present invention.

FIG. 2 is a diagram of a container having a fluid and point at a height h therein for which a static hydropressure measurement can be taken.

FIG. 3 is a graph of the sensor pressure for samples.

FIG. 4 is a graph showing measured pressure and computer pressure for a run of samples.

FIG. 5 is a graph showing measured pressure and corrected pressure for a run of samples.

To reduce clutter in the drawing, each Figure in the drawing does not necessarily include every reference label for every element shown therein.

DETAILED DESCRIPTION OF BEST MODE OF THE INVENTION

FIG. 1

By way of example, FIG. 1 shows the present invention in the form of apparatus 10, e.g., including a probe for taking a water depth measurement using a pressure sensor P and a water velocity determination module 20. According to some embodiments of the present invention, the apparatus 10 may include a signal processor 10a configured to:

receive signaling containing information about a water depth measurement determined from a pressure sensed by a pressure sensor contained in a probe immersed in flowing water, and also containing information about a velocity-dependent offset that is determined and depends on the velocity of the flowing water; and determine corresponding signaling containing information about a corrected water depth measurement of the flowing water by correcting the water depth measurement by the velocity-dependent offset in order to compensate for Venturi effects on the pressure sensor in the moving water, based upon the signaling received.

The signal processor 10a may be configured to provide the corresponding signaling containing information about the corrected water depth measurement of the flowing water, e.g., for further processing.

Implementation of Signal Processing Functionality

By way of example, and as one skilled in the art would appreciate, the functionality of the signal processor 10a may be implemented using hardware, software, firmware, or a combination thereof. In a typical software implementation, the signal processor 10a would include one or more microprocessor-based architectures having, e.g., at least one signal processor or microprocessor like element 10a. One skilled in the art would be able to program with suitable program code such a microcontroller-based, or microprocessor-based, implementation to perform the signal processing functionality disclosed herein without undue experimentation, e.g., using one or more of the methods or algorithms disclosed herein.

For example, the signal processor 10a may be configured, e.g., by one skilled in the art without undue experimentation, to receive the signaling containing information about the water depth measurement determined from the pressure sensed by the pressure sensor contained in the probe immersed in the flowing water, and also containing information about the velocity-dependent offset that is determined and depends on the velocity of the flowing water, consistent with that disclosed herein. By way of example, this signaling may be stored in a memory module device, circuit or component, e.g., like element 10b, as described below.

By way of further example, the signal processor 10a may be configured, e.g., by one skilled in the art without undue experimentation, to determine the corresponding signaling containing information about the corrected water depth measurement of the flowing water by correcting the water depth measurement by the velocity-dependent offset in order to compensate for the Venturi effects on the pressure sensor in the moving water, based upon the signaling received, and consistent with that disclosed herein.

The scope of the invention is not intended to be limited to any particular implementation using technology either now known or later developed in the future. The scope of the invention is intended to include implementing the functionality of the signal processor(s) 10a as stand-alone processor, signal processor, or signal processor module, as well as separate processor or processor modules, as well as some combination thereof. According to some embodiments, the signal processor 10a may be configured as part of the pressure sensor P, or as part of another processor or processing module that forms part of the apparatus 10. The scope of the invention is not intended to be limited to what circuit, component or other element that the signal processor 10a may form part of.

By way of example, the signal processor, or signal processing module 10a may also include, e.g., other signal processor circuits or components generally indicated 10b, including random access memory or memory module (RAM) and/or read only memory (ROM), input/output devices and control, and data and address buses connecting the same, and/or at least one input processor and at least one output processor, e.g., which would be appreciate by one skilled in the art.

By way of further example, the signal processor 10a and other signal processor circuits or components generally indicated 10b may include, or take the form of, some combination of a signal processor and at least one memory including a computer program code, where the signal processor and at least one memory are configured to cause the system to implement the functionality of the present invention, e.g., to respond to signaling received and to determine the corresponding signaling, based upon the signaling received.

FIGS. 2-5: The Methodology

By way of example, the basic methodology may include the following:

i) Correction of Dynamic Pressure

As one skilled in the art would appreciate, when measuring water pressure at a specific point within a water column, the water pressure or total pressure is the sum of the Hydrostatic Pressure (P) and Dynamic Pressure (Pd) given in Equation 3:1.

$$P_0 = P + P_d \qquad \text{(Equation 3:1—Total Pressure)}$$

When stagnant (water velocity is zero) water is present, the Dynamic Pressure (Pd) component can be excluded from Total Pressure (Po) and thus the Hydrostatic Pressure (P) is equal to the Total Pressure (Po). The Total Pressure in Equation 3:1 for Stagnant Water can be reworked in Equation 3:2, $$P_0 = P \qquad \text{(Equation 3:2—Total Pressure—Stagnant Water)}$$

Consistent with that shown in FIG. 2, hydrostatic Pressure (P) is defined by the Water Depth (h), Gravity Acceleration (g) and Water Density (p) given in Equation 3:3, as follows:

$$P = \rho g h \qquad \text{(Equation 3:3—Hydrostatic Pressure)},$$

Where: ρ—water\liquid Density,
g—acceleration gravity, and
h—height water\liquid above sensor.

As one skilled in the art would also appreciate, when water is flowing the Dynamic Pressure is directly related to the water velocity and needs to be accounted for in calculating the Total Pressure (Po). Dynamic Pressure (Pd) is defined by the Water Density (ρ) and Water Velocity (V) given in Equation 3:4, as follows:

$$P_d = 0.5\rho V^2 \quad \text{(Equation 3:4—Dynamic Pressure).}$$

ii) Drag/Correction Coefficient

As one skilled in the art would appreciate, the effect of drag force on pressure measurements can be corrected by applying a drag\correction coefficient to the calculated Dynamic Pressure. The Total Pressure (Po) in Equation 3.1 may be reworked to devise a Corrected Pressure (Pc) that incorporates drag\correction coefficient, e.g., using Equation 3.5 that yields, $$P_c = P_m + 0.5\rho(aV)^2 \quad \text{(Equation 3:5—Corrected Pressure),}$$

Where: Pm—pressure measured,
ρ—water\liquid density,
a—drag\correction coefficient, and (As one skilled in the art would appreciate, the Drag\Correction coefficient is determined from a calibration and is unique to an instrument or instrument range family; and the drag\correction coefficient is related to the geometry of the instrument and the relative pressure position to the velocity measuring sensor or module like element 20 (see FIG. 1).)
V—measured water velocity.

By way of example, the drag\correction coefficient can be computed from experimental data for particular head\instrument\probe. If one arranges the data pressure and velocity data, e.g., Equation 3.6 yields, $$P_c = P_m + cV^2 \quad \text{(Equation 3:6—Corrected Pressure—Coefficient "c"),}$$

Where: Pc—corrected pressure,
Pm—measured pressure readings at certain velocity,
$c = 0.5\rho a^2$, and
V—water speeds measured by the water velocity sensor or module like element 20.

For the purpose of that calibration, one can devise a setup where the depth of the pressure sensor is kept constant and allow for varying the speed of the water/liquid around the sensor at the same time. The water/liquid temperature can also be controlled along with controlling the salinity, thus controlling the density.

Taking multiple measurements with varying the water/liquid speed in the setup described above and using linear regression, one can determine the best "c" fit. Solving the coefficient "c", e.g., using Equation 3.7 yields, $$c = \frac{(P_c - P_m)}{V^2}. \quad \text{(Equation 3:7-Coefficient "c")}$$

Since the environment is controlled, one can compute "a" in Equation 3.8, as follows:

$$a = \sqrt{c/(0.5\rho)} \quad \text{(Equation 3:8—Drag\Correction Coefficient),}$$

Where: c—the best fit c, and
ρ—water/liquid density.

Experimental Data

The correction for dynamic pressure due to the effect of water velocity on the measured water pressure was investigated in a towing tank under control conditions. The water condition in the towing tank was stagnant before the tests commenced with no visible external influences. The instrument was mounted at a fixed position on the towing cart during the entire tests. The water pressure data collected during the towing tank test is graphically shown in FIG. 3. The data highlighted by the line R indicates the cart at rest (e.g., simulate stagnant water) before and in between the different velocity runs. As shown in FIG. 3, the water pressure or total pressure measured when the towing cart was at rest was approximately 10.446 dBar. Each velocity run represents an increase of water speed with 0.3 ft/s (feet/second) over the previous run, starting with 1.2 ft/s for the initial run. In FIG. 3, see the different dBar readings identified by labels 1.31234 ft/s, 1.64042 ft/s, 1.9685 ft/s and 2.29659 ft/s, which show the effects of water velocity on pressure measurements.

The methodology outlined under Drag\Correction Coefficient was verified by calculating the theoretical or computed pressure using Equation 3:9 below. Applying Equation 3.9, the measured pressure can be simulated by using the constant Pc and stepping through the velocity runs used during the tests. By way of example, FIG. 4 shows a comparison of this simulated pressure to the actual measured pressure.

Equation 3.9 is as follows:

$$P_{com} = P_c - 0.5\rho(aV)^2 \quad \text{(Equation 3:9—Computed Pressure)}$$

Where: Pc—corrected pressure, and
$P_{com}$—computed pressure.

The methodology outlined under Drag\Correction Coefficient was verified by calculating the corrected pressure using Equation 3:5 above, which is repeated below. The comparison between "Measured pressure" that is the raw pressure sensor readings against the "Corrected pressure" is shown and given in FIG. 5.

$$P_c = P_m + 0.5\rho(aV)^2 \quad \text{(Equation 3:5—Corrected Pressure).}$$

The Process

1. By way of example, the method for compensating for Venturi effects on pressure sensors in moving water may include the following:
    a) A method for compensating for Venturi effect on pressure sensors in moving water, e.g., using a collocated or closely located 2D/3D point Doppler water velocity measurement, measured or user input temperature and computed water density data, may include the following:
        i) Where the instrument is calibrated such that the proper water velocity drag coefficient is proportional to the water velocity measured at the point of velocity measurement and the actual water velocity at the point of compensation for the effect is calculated;
        ii) Where recorded or real-time measured data for water velocity at the point of water velocity measurement is collected; and
        iii) Where recorded or real-time measured data of the pressure at the point of water pressure measurement is collected; and iv) Where recorded, real-time measured or user specified data of the water temperature is collected; and
v) Where recorded, real-time measured or user specified data of the water density is collected, or
1) Where recorded, real-time measured or user specified data of the water salinity is collected, and
2) Recorded, real-time measured or user specified data of the instrument altitude is collected, and
3) Water density is computed and recorded or used real-time;
vi) Where collected sample data containing water velocity, temperature, density and pressure is used in real-time or in post processing; and
vii) Where a dynamic pressure correction is computed based on the above described data.
b) The method for compensating for Venturi effect on pressure sensors in moving water, e.g., using a collocated or closely located 2D/3D profiled cells velocity measurement, measured or user input temperature and computed water density data, may include the following:
i) Where the instrument is calibrated such that proper water velocity drag coefficient is proportional to the water velocity measured at the point of velocity measurement and the actual water velocity at the point of compensation for the effect is calculated; and
ii) Where recorded or real-time measured data for water velocity at the point of water velocity measurement is collected; and
iii) Where recorded or real-time measured data of the pressure at the point of water pressure measurement is collected: and
iv) Where recorded, real-time measured or user specified data of the water temperature is collected; and
v) Where recorded, real-time measured or user specified data of the water density is collected; or
1) Where recorded, real-time measured or user specified data of the water salinity is collected, and
2) Recorded, real-time measured or user specified data of the instrument altitude is collected, and
3) Water density is computed and recorded or used real-time;
vi) Where collected sample data containing water velocity, temperature, density and pressure is used in real-time or in post processing;
vii) Where the dynamic pressure correction is computed based on the above described data.
2) A method for compensating for Venturi effects on pressure sensors in moving water and computing a proper instrument depth may include the following:
a) Implementing all steps made for one or more of the methods in 1 above; and
b) Where corrected pressure is computed and recorded or used real-time based on sample pressure data and computed dynamic pressure correction;
c) Where recorded, user specified data of the pressure sensor offset from the mounting fixture; and
d) Where recorded, user specified time interval of pressure sensor calibration against atmospheric pressure; and
e) Where requested, remove instrument\pressure sensor out of the water; and
f) Where recorded, real-time measured atmospheric pressure is collected to calibrate pressure sensor; and
g) Where requested, lower instrument\pressure sensor to the bottom; and
h) Where recorded, real-time measured or user specified data of the total water pressure\depth; and
i) Where requested, adjust the instrument\pressure sensor to calculated measurement depth; and
j) Where recorded, real-time measured or user specified data of the instrument depth in the water.
3. A method for compensating for Venturi effects on pressure sensors in moving water, e.g., by computing a proper instrument depth and collecting a water profile, may include the following:
a) Implementing all steps made for one or more of the methods 1; and
b) Implementing all steps made for the method 2; and
c) Where the corrected pressure is computed, and recorded or used real-time is based on sample pressure data and a computed dynamic pressure correction.
d) Where recorded, user specified data of the pressure sensor offset from the mounting fixture; and
e) Where recorded, system specified time interval of the pressure sensor calibration against atmospheric pressure or total water depth above the instrument from a vertical acoustic Doppler beam; and
f) Where requested, pressure sensor calibration by removing instrument\pressure sensor out of the water, or by using the total water depth above the instrument from the vertical acoustic Doppler beam; and
g) Where recorded, real-time measured atmospheric pressure or total water depth above the instrument from vertical acoustic Doppler beam is collected to calibrate pressure sensor; and
h) Where requested, mount instrument\pressure sensor to the bottom of channel; and
i) Where recorded, real-time measured of the total water pressure\depth; and
j) Where recorded, calculated cell size and number of cells with the water profile from corrected pressure data.

Algorithm

An example of an algorithm for a hardware/software implementation was developed in the apparatus 10, e.g., including the product sold in the marketplace under the name, FlowTracker2™ ADV®, e.g., as described above, to compensate pressure sensor measurements used to determine for water depth for dynamic pressure, e.g., consistent with that described below:

Dynamic pressure is the kinetic energy per unit volume of fluid and affects the pressure sensor measurements performed by the apparatus 10's internal pressure sensor in flowing water. The extent of the dynamic pressure affecting the pressure sensor measurements is directly related to the water velocity. The correction for dynamic pressure on the apparatus 10's pressure sensor measurements is described herein.

In fluid dynamics, the Total Pressure ($P_0$) is defined as the sum of the Static Pressure (P) and the Dynamic Pressure (Pd), as follows:

$$P_0 = P + P_d \qquad \text{(Equation 4:10—Total Pressure).}$$

The internal pressure sensor implemented in the apparatus 10 provides an accurate measurement of the Total Pressure (P0). Calculating depth from pressure requires the Static Pressure (P) to be known. For still or slow moving water the Dynamic Pressure (Pd) is negligible and thus the Static Pressure (P) and the Total Pressure (P0) are very close. Using the Total Pressure (P0) as measured by the pressure sensor instead of the Static Pressure (P) in these cases provides a good conversion for all practical purposes.

However, for faster flowing water, ignoring the Dynamic Pressures (Pd) is not an option and would result in a significant error in the pressure-to-depth conversion. Correcting for Dynamic Pressure is essential to ensure a proper depth computation.

Dynamic Pressure (Pd) is defined as, $$P_d = 0.5 \times \text{WaterDensity} \times \text{WaterSpeed}^2 \quad \text{(Equation 4:11—Dynamic Pressure)}$$

Parameters required in Equation 4:11 include the following:

1) By way of example, WaterDensity can be approximated, or in the case of the product known as the FlowTracker2™, it may be precisely computed from Salinity data (e.g., using a user entry in the field), Latitude and Altitude (from an integrated GPS), 2) By way of example, WaterSpeed may be provided by the apparatus (e.g., by the ADV (the main function of the FlowTracker2™ is to measure water velocity (see element 20 (FIG. 1), so this functionality is embedded in the product, as one skilled in the art would appreciate). To produce a precise WaterSpeed, the AdvWaterSpeed (measured water speed) is corrected by a constant "head drag coefficient" (a), which describes the flow disturbance around the pressure sensor introduced by the ADV head and is different for different head shapes (e.g. 2D or 2D/3D), e.g., as one skilled in the art would appreciate.

Equation 4:12 may be used to determine corrected water speed, e.g., as follows:

$$\text{WaterSpeed} = \text{AdvWaterSpeed} \times a \quad \text{(Equation 4:12—Corrected AdvWaterSpeed)}$$

If one substitutes Equation 4:12 in Equation 4:11, then the dynamic pressure can be computed using (Equation 4:13, as follows:

$$P_d = 0.5 \times \text{WaterDensity} \times (\text{AdvWaterSpeed} \times a)^2 \quad \text{(Equation 4:13—Dynamic Pressure using AdvWaterSpeed)}$$

Knowing the Dynamic Pressure (Pd) and the Total Pressure (P0)—the static pressure can then be computed, e.g., by using Equation 4:14, as follows:

$$P = P_0 - P_d \quad \text{(Equation 4:14—Static Pressure)}$$

If one substitutes (Equation 4:13 in Equation 4:14 the final equation for correcting the pressure measured by the apparatus 10's internal pressure sensor may be defined in Equation 4:15, e.g., as follows:

$$P = P_0 - 0.5 \times \text{WaterDensity} \times (\text{AdvWaterSpeed} \times a)^2 \quad \text{(Equation 4:15—Corrected Pressure)}$$

The corrected pressure may be used, e.g., to compensate for Venturi effects on the pressure sensor by the moving water for taking the water depth measurement, according to the present invention.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. Apparatus for taking a water depth measurement using a probe, comprising:
   a signal processor configured to
      receive signaling containing information about a water depth measurement determined from a pressure sensed by a pressure sensor contained in a probe immersed in flowing water, and also containing information about a velocity-dependent offset that is determined and depends on the velocity of the flowing water; and
      determine corresponding signaling containing information about a corrected water depth measurement of the flowing water by correcting the water depth measurement by the velocity-dependent offset in order to compensate for Venturi effects on the pressure sensor in the moving water.

2. Apparatus according to claim 1, wherein the signal processor is configured to determine the velocity-dependent offset by compensating a dynamic pressure component based upon a pressure correction coefficient to account for the Bernoulli Effect of the water depth measurement, where the dynamic pressure component is defined by the relationship:

$$pv^2/2,$$

where p represents the fluid density and v represents the fluid speed of the moving water.

3. Apparatus according to claim 1, wherein the apparatus comprises the probe having the pressure sensor contained therein.

4. Apparatus according to claim 3, wherein the pressure sensor is a non-vented pressure sensor.

5. A method for taking a water depth measurement using a probe, comprising:
   receiving, with a signal processor, signaling containing information about a water depth measurement determined from a pressure sensed by a pressure sensor contained in a probe immersed in flowing water, and also containing information about a velocity-dependent offset that is determined and depends on the velocity of the flowing water; and
   determining, with the signal processor, corresponding signaling containing information about a corrected water depth measurement of the flowing water by correcting the water depth measurement by the velocity-dependent offset in order to compensate for Venturi effects on the pressure sensor in the moving water.

* * * * *